(12) United States Patent  
Lee (10) Patent No.: US 9,541,570 B2
(45) Date of Patent: Jan. 10, 2017

(54) SPEED MEASURING DEVICE FOR CONVEYOR LINE (71) Applicant: Hyundai Motor Company, Seoul (KR)

(72) Inventor: Jaehyun Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 489 days.

(21) Appl. No.: 14/081,828

(22) Filed: Nov. 15, 2013

(65) Prior Publication Data

US 2014/0293268 A1 Oct. 2, 2014

(30) Foreign Application Priority Data

Apr. 2, 2013 (KR) .......... 10-2013-0036030

(51) Int. Cl.
*G01P 3/36* (2006.01)
(52) U.S. Cl.
CPC ........................ *G01P 3/36* (2013.01)
(58) Field of Classification Search
CPC .......................................................... G01P 3/36
See application file for complete search history.

(56) References Cited

U.S. PATENT DOCUMENTS

| | | | | |
|---|---|---|---|---|
| 5,923,020 | A * | 7/1999 | Kurokawa | G01N 21/8806 235/454 |
| 2009/0095600 | A1 * | 4/2009 | Reichenbach | B07C 3/14 198/810.01 |
| 2010/0008560 | A1 * | 1/2010 | Lee | G01N 21/8901 382/141 |
| 2010/0142798 | A1 * | 6/2010 | Weston | G01B 11/007 382/141 |

FOREIGN PATENT DOCUMENTS

| | | | |
|---|---|---|---|
| JP | 6-246592 | A | 6/1994 |
| JP | 9-318337 | A | 12/1997 |

OTHER PUBLICATIONS

IR-Photo.net "Infrared Photography". http://www.ir-photo.net/ir_imaging.html.*

* cited by examiner

*Primary Examiner* — Luke Ratcliffe
*Assistant Examiner* — Samantha K Abraham
(74) *Attorney, Agent, or Firm* — Morgan, Lewis & Bockius LLP

(57) ABSTRACT

A speed measuring apparatus for a conveyor line may include a lighting unit mounted to one side of the conveyor line with a bracket, a coupling module coupled to an upper side of the lighting unit, the coupling module having coupling portions formed on both sides of an upper side thereof, respectively, a camera having a lens unit mounted between the coupling portions to face downward for taking a picture of an image of the object on the conveyor line under operation, a lens rotation device having a motor mounted to end portions of, and between, the coupling portions for selective positioning of a magnifying lens matched to the lens unit of the camera as the motor may be driven, and a controller for controlling operation of the lens rotation device and comparing images taken by the camera at different times to determine a speed of the object.

9 Claims, 6 Drawing Sheets (S1)

SPEED MEASURING DEVICE FOR CONVEYOR LINE

CROSS-REFERENCE TO RELATED APPLICATION

The present application claims priority to Korean Patent Application No. 10-2013-0036030 filed on Apr. 2, 2013, the entire contents of which is incorporated herein for all purposes by this reference.

BACKGROUND OF THE INVENTION

Field of the Invention

The present invention relates to a speed measuring device for a conveyor line. More particularly, the present invention relates to a speed measuring device for a conveyor line, which is simple to mount, and enables accurate measurement of a speed of a conveyor line without an error.

Description of Related Art

In general, in the related art, a bar code recognizing method is used for determining a position of a vehicle.

That is, if the vehicle enters a particular process, a bar code reader mounted to an entrance thereof reads the bar code attached to the vehicle, to determine that the vehicle enters the process.

However, the method only enables to know a process the vehicle passes presently merely, but is difficult to determine an accurate position of the vehicle in the process.

In order to improve this, it is required to make real time measurement of the speed of the conveyor line and combine the speed with bar code reading information.

Entry of the vehicle to the process line is determined at a time point the bar code reader reads the bar code of the vehicle, and, thereafter, a detailed position of the vehicle is determined by using the speed of the conveyor line and time information collected in real time.

For this, accurate recognition of the speed of the conveyor is important.

A related art speed measuring method is reception of speed information at an encoder mounted to a motor which drives the conveyor.

However, the method has a drawback of requiring a large sized construction work for installation of the motor under the conveyor line, and also has a drawback of poor accuracy of the position information if slip takes place between the motor and a cart in the conveyor which is configured in a friction system.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a speed measuring device for a conveyor line, which is easy to mount, and enables accurate speed measurement.

In an aspect of the present invention, a speed measuring apparatus for a conveyor line may include a lighting unit mounted to one side of the conveyor line with a bracket for lighting a surface to be measured of an object on the conveyor, a coupling module coupled to an upper side of the lighting unit, the coupling module having coupling portions formed on both sides of an upper side thereof, respectively, a camera having a lens unit mounted between the coupling portions to face downward for taking a picture of an image of the object on the conveyor line under operation, a lens rotation device having a motor mounted to end portions of, and between, the coupling portions for selective positioning of a magnifying lens matched to the lens unit of the camera as the motor is driven, and a controller for controlling operation of the lens rotation device and comparing images taken by the camera at different times to determine a speed of the object.

The coupling module may include a "U" shaped curved frame having the coupling portions formed extended from both sides of an upper side thereof.

The lighting unit is arranged in a curved shape the same with the curved frame.

The lighting unit is an infrared lighting.

The lighting unit is a dark field lighting.

The lighting unit lights the surface to be measured at an angle below 10 degrees with reference to the surface to be measured.

The camera is an infrared camera.

The lens rotation device may include the motor having a rotation shaft mounted between the coupling portions, a lens frame connected to the rotation shaft of the motor, and the magnifying lens mounted to the lens frame for being selectively positioned matched to the lens unit of the camera as the motor is driven.

The controller controls operation of the lens rotation device for positioning the magnifying lens matched to the lens unit, controls the camera to take the picture of the object, makes coordinate transformation of an image of the object the picture thereof is taken with the camera and storing a coordinate transformed image, and determines a moving speed of the object by using a coordinate movement of the images coordinate transformed and times the pictures are taken, respectively.

The controller controls operation of the lens rotation device such that the magnifying lens moves away from the lens unit, takes the picture of the object with the camera, makes coordinate transformation of the image of the object the picture thereof is taken with the camera and storing a coordinate transformed image, and determines that there is an error taken place in images when it is determined that the images coordinate transformed may have changes.

The lens frame may have a semicircular shape.

In another aspect of the present invention, a speed measuring apparatus for a conveyor line may include a coupling module mounted to one side of the conveyor line with a bracket, the coupling module having coupling portions formed on both sides of an upper side thereof, respectively, an infrared lighting mounted to one side of a lower side of the coupling module for lighting an object on the conveyor line with an infrared beam, an infrared camera having a lens unit mounted between the coupling portions to face downward for obtaining an infrared image of the conveyor under operation, a lens rotation device for positioning a magnifying lens matched to the infrared camera, selectively, and a controller for controlling operation of the lens rotation device and comparing the images taken by the camera at different times to determine a speed of the object.

The lens rotation device may include the motor having a rotation shaft mounted between the coupling portions, a lens frame connected to the rotation shaft of the motor, and the magnifying lens mounted to the lens frame for being selectively positioned matched to the lens unit of the camera as the motor is driven.

The controller controls operation of the lens rotation device for positioning the magnifying lens matched to the lens unit, controls the camera to take a picture of the object, makes coordinate transformation of an image of the object the picture thereof is taken with the camera and storing a coordinate transformed image, and determines a moving speed of the object by using a coordinate movement of images coordinate transformed thus and times the pictures are taken.

The controller controls operation of the lens rotation device such that the magnifying lens moves away from the lens unit, takes a picture of the object with the camera, makes coordinate transformation of the image of the object the picture thereof is taken with the camera and storing a coordinate transformed image, and determines that there is an error taken place in images when it is determined that the images coordinate transformed may have changes.

The speed measuring device for a conveyor line in accordance with an exemplary embodiment of the present invention has an effect of measuring an accurate speed of the conveyor line by using the infrared camera, the infrared lighting, and the magnifying lens, even in an environment in which disturbance and like occurs, intensively.

Moreover, the speed measuring device can be mounted to an existing conveyor line readily, and a high precision of vehicle position calculation is made available in a production process of the vehicle, thereby permitting a high level of production career management of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereafter, a speed measuring device for a conveyor line in accordance with an exemplary embodiment of the present invention will be described with reference to accompanying drawings, in detail.

However, since a size and a thickness of an element in the drawing are shown not to scale for convenience of description, the description of the present invention is not limited to the drawing necessarily, and the thickness is shown enlarged for clarity of different parts and regions.

And, parts not relevant to the description of the present invention are omitted for making the description of an exemplary embodiment of the present invention clear.

Figure 1:
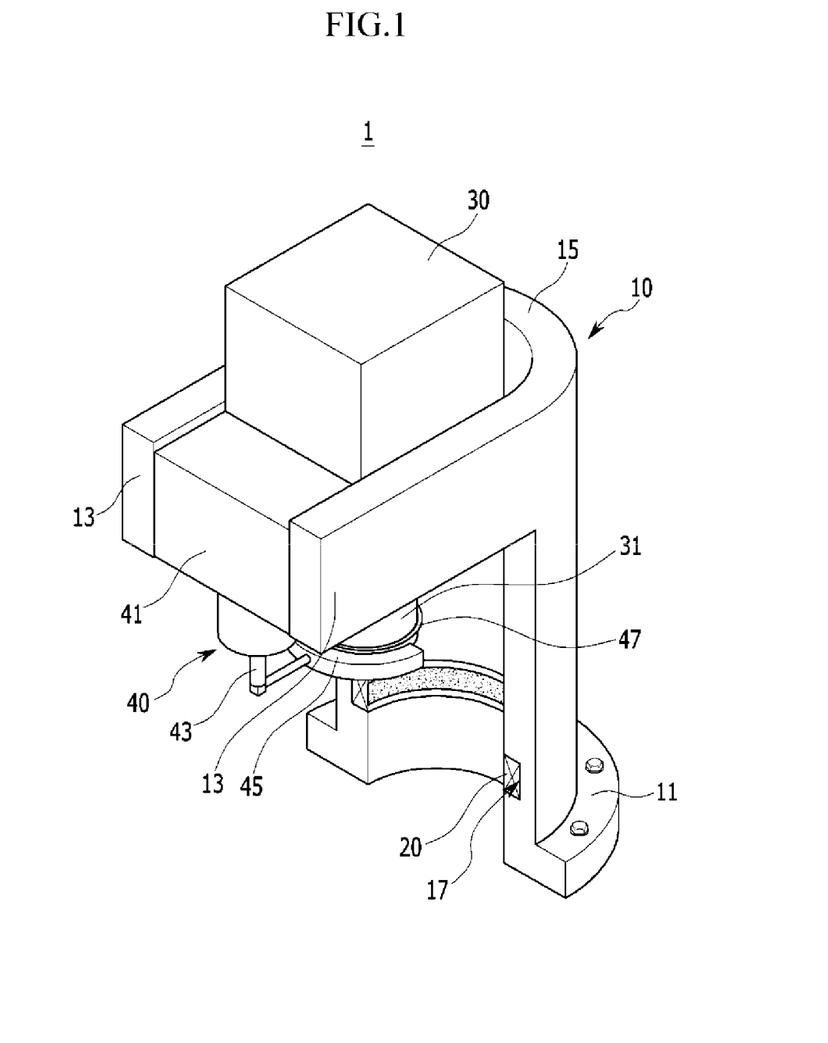
FIG. 1 illustrates a perspective view of a speed measuring device for a conveyor line in accordance with an exemplary embodiment of the present invention.
Figure 2:
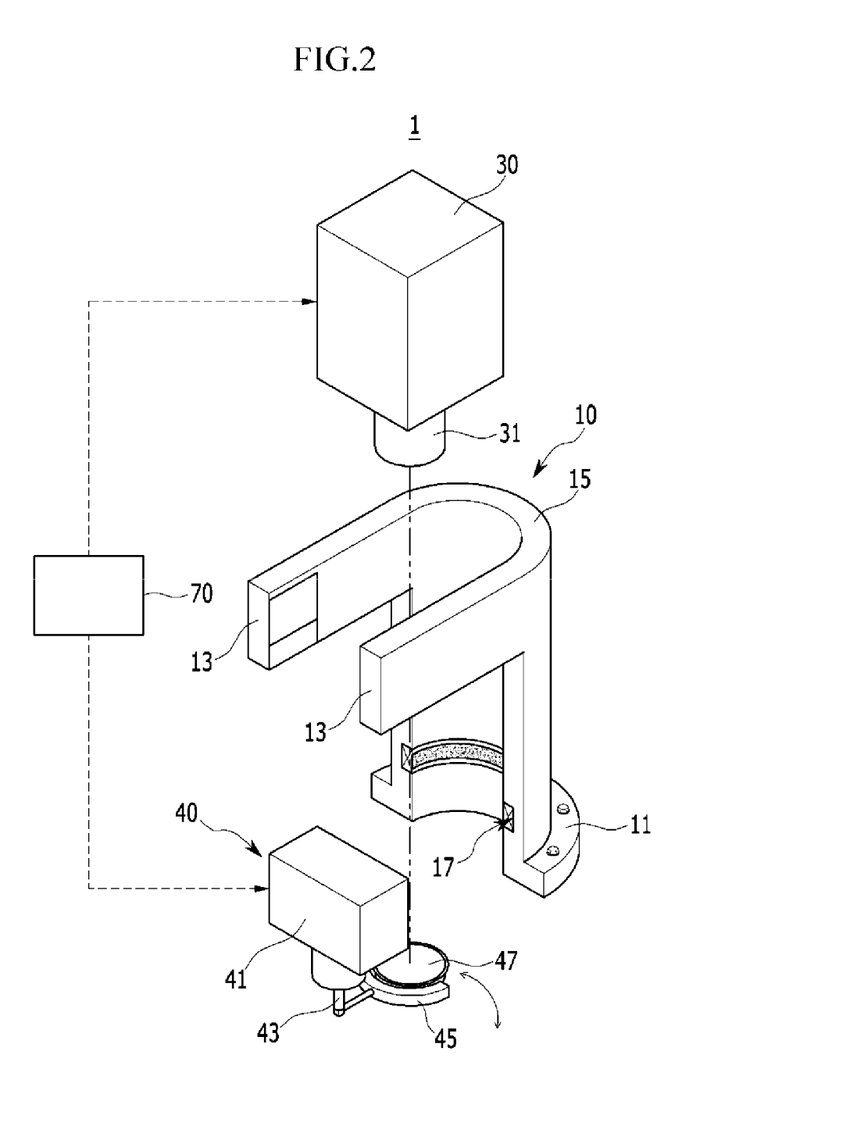
FIG. 2 illustrates an exploded perspective view of a speed measuring device for a conveyor line in accordance with an exemplary embodiment of the present invention.
Figure 3:
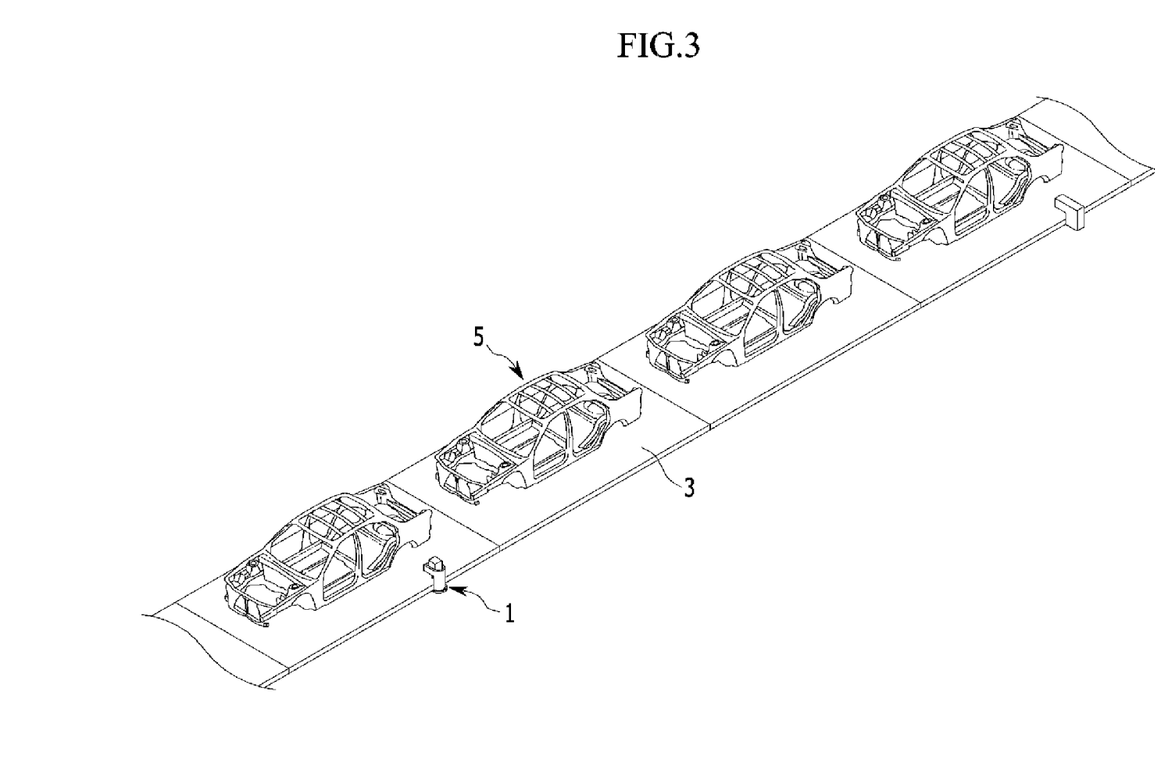
FIG. 3 illustrates a perspective view of a conveyor line process having a speed measuring device in accordance with an exemplary embodiment of the present invention applied thereto.

FIG. 1 illustrates a perspective view of a speed measuring device for a conveyor line in accordance with an exemplary embodiment of the present invention, FIG. 2 illustrates an exploded perspective view of a speed measuring device for a conveyor line in accordance with an exemplary embodiment of the present invention, and FIG. 3 illustrates a perspective view of a conveyor line process having a speed measuring device in accordance with an exemplary embodiment of the present invention applied thereto.

Referring to FIGS. 1 to 3, the speed measuring device 1 for a conveyor line (Hereafter, a speed measuring device) in accordance with an exemplary embodiment of the present invention can be mounted easily, and make accurate measurement of the speed of the conveyor line 3 without an error.

The speed measuring device 1 for a conveyor line in accordance with an exemplary embodiment of the present invention includes a coupling module 10, an infrared lighting 20, an infrared camera 30, a lens rotation means 40, and a controller 70 for controlling operation of the infrared camera 30, and the lens rotation means 40.

At first, the coupling module 10 is mounted to one side of the conveyor line 3 with a bracket 11, and has coupling portions 13 formed on an upper side of both side of the coupling module 10, respectively.

The coupling module 10 is a "U" shaped curved frame 15, with the coupling portions 13 extended from both sides of the curved frame 15, respectively.

And, the infrared lighting 20 is mounted to one side of a lower side of the coupling module 10 for lighting a surface to be measured on the conveyor line 3.

In this case, the infrared lighting 20 is mounted by using a mounting groove 17 formed in an inside of the lower side of the curved frame 15.

The infrared lighting 20 is in a dark filed lighting mode, and arranged to have a curved shape the same with the curved frame 15.

The dark field lighting expresses contours of an object bright, i.e., is a lighting technology for expressing dark contours into a bright contours.

And, the infrared lighting 20 makes an object, i.e., the surface to be measured of the vehicle 5 to be lighted at an angle below 10 degrees with reference to the object, i.e., the surface to be measured, of the vehicle 5 on the conveyor line 3. This is because the infrared lighting lighted in the dark field lighting mode emphasizes fine bending on the surface to be measured, to make analysis of the image easy.

The infrared camera 30 has a lens unit 31 mounted to face downward between the coupling portions 13 for obtaining an infrared image of the vehicle 5 on the conveyor line 3.

In a mass production site in which disturbance by an unintended light incident from surroundings takes place frequently, the infrared camera 30 functions to reduce a probability of occurrence of a measuring error caused by the disturbance, significantly.

That is, though a general camera may make accuracy of the image analysis poor due to the disturbance, the infrared camera 30 excludes a light of a visible ray band which is liable to take place in a factory environment, only to recognize the light from the infrared lighting 20.

The lens rotation means 40 is mounted between the coupling portions 13 at an end portion thereof for positioning or removing a magnifying lens 47 matched to the lens unit 31 of the infrared camera 30.

In this case, the lens rotation means 40 includes a motor 41, a lens frame 45, and the magnifying lens 47.

The motor 41 is mounted between the coupling portions 13, and the lens frame 45 is connected to a rotation shaft 43 of the motor 41.

The magnifying lens 47 is mounted to the lens frame 45 for being selectively positioned matched to the lens unit 31 of the infrared camera 30 as the motor 41 is driven.

The operation and effects of the speed measuring device in accordance with an exemplary embodiment of the present invention will be described.

Figure 4:
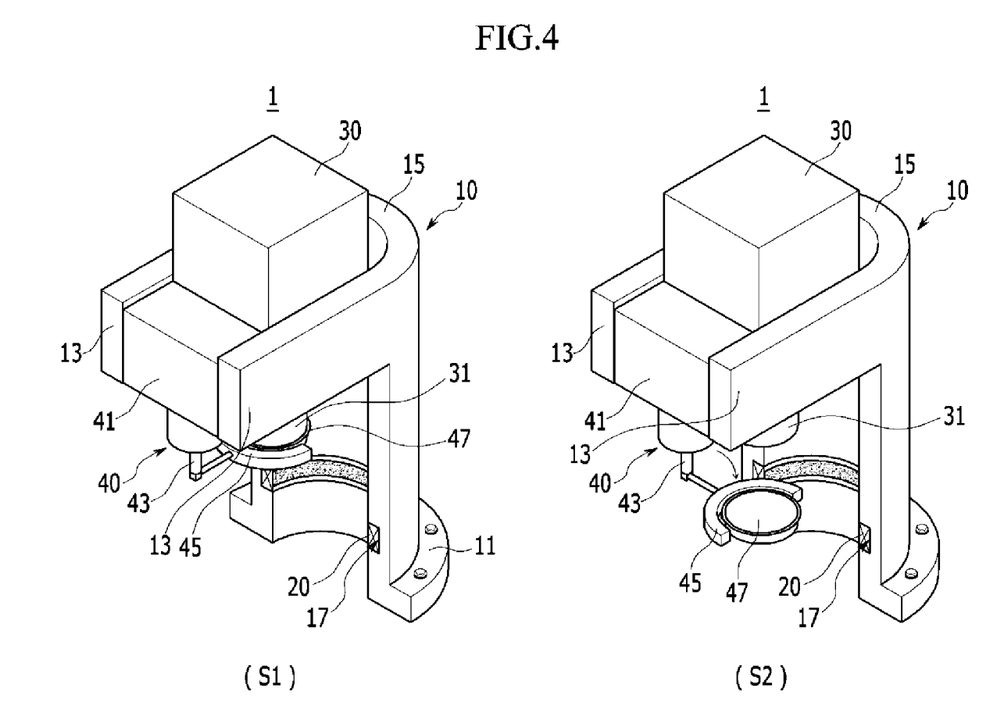
FIG. 4 illustrates perspective views showing operation states of a speed measuring device in accordance with an exemplary embodiment of the present invention.
Figure 5:
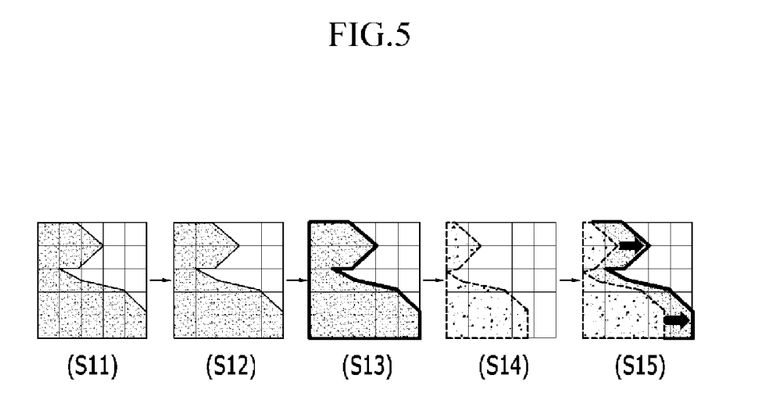
FIG. 5 illustrates images on image information obtained in an enlarged mode of a speed measuring device in accordance with an exemplary embodiment of the present invention
Figure 6:
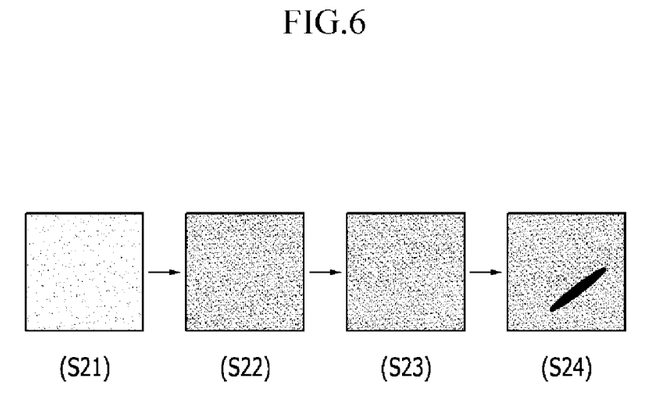
FIG. 6 illustrates images on image information obtained in a general mode of a speed measuring device in accordance with an exemplary embodiment of the present invention.

FIG. 4 illustrates perspective views showing operation states of a speed measuring device in accordance with an exemplary embodiment of the present invention, FIG. 5 illustrates images on image information obtained in an enlarged mode of a speed measuring device in accordance with an exemplary embodiment of the present invention, and FIG. 6 illustrates images on image information obtained in a general modes of a speed measuring device in accordance with an exemplary embodiment of the present invention, respectively.

Referring to Si of FIG. 4, in order to obtain image information from the speed measuring device 1 in the enlarged mode, the controller 70 controls operation of the lens rotation means 40, i.e., the motor 41, to position the magnifying lens 47 under the infrared camera 30.

In this state, the controller 70 controls operation of the infrared camera 30 to take a picture of the vehicle 5.

In this state, referring to S11 to S15 of FIG. 5, from the images in the enlarged mode obtained with the camera 30, a moving speed of the vehicle 5 on the conveyor line 3 is measured based on a pattern matching technology.

At first, in a state the magnifying lens 47 is positioned at the lens unit 31 of the infrared camera 30, images of the vehicle 5 on the conveyor line 3 are obtained. (S11)

Then, the controller 70 subjects the images of the vehicle 5 on the conveyor line 3 obtained thus to a binary numbering process, to make a coordinate transformation. (S12)

Then the controller 70 analysis a pattern of the images subjected to the binary numbering process thus and stores the same. (S13)

Upon finishing the step S13, the controller 70 compares a current image pattern of the vehicle 5 with the current image pattern obtained and stored right before. (S14) That is, the controller 7 detects coordinate changes of the image of the same pattern.

The controller 70 calculates a moving speed of the vehicle 5 on the conveyor line 3 by using coordinate changes of the portions having the same patterns and taking time differences of the images. (S15)

In the meantime, referring to S2 of FIG. 4, in order to obtain the image information in the general mode of the speed measuring device 1 in accordance with an exemplary embodiment of the present invention, the controller 70 controls the motor 41 to move the magnifying lens 47 away from under the lens unit 31 of the infrared camera 30.

In this state, the controller 70 obtains the image of the vehicle 5 on the conveyor line 3 by using the infrared camera 30. (S21)

Then, the controller 70 subjects the image of the vehicle 5 on the conveyor line 3 obtained by the infrared camera 30 to the binary numbering process. (S22)

Then, upon detecting a sudden image changes in comparison to the image of the vehicle 5 on the conveyor line 3 obtained before shown in S23 of FIG. 6, the controller 70 determines that there is foreign matter introduced to the conveyor line 3. (S24) That is, upon detecting noise, such a spot shown in S24 of FIG. 6, the controller 70 determines that there is a sudden environmental change, such as introduction of foreign matter to the conveyor line 3, to determine that there is an error in a current speed measurement.

Upon application of the speed measuring device 1 for a conveyor line in accordance with an exemplary embodiment of the present invention, measurement of an accurate speed of the vehicle 5 on the conveyor line 3 is possible by using the infrared camera 30, the infrared lighting 20, and the magnifying lens 47, even in an environment in which disturbance and like occurs, intensively.

Moreover, the speed measuring device can be mounted to an existing conveyor line readily, and a high precision of vehicle position calculation is made available in a production process of the vehicle 5, thereby permitting a high level of production career management of the vehicle 5.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A speed measuring apparatus for a conveyor line comprising:

a lighting unit mounted to one side of the conveyor line with a bracket for lighting a surface of an object on the conveyor line;

a coupling module coupled to a side of the lighting unit, the coupling module having coupling portions formed on first and second sides of the coupling module;

a camera having a lens unit mounted between the coupling portions to face in a direction for acquiring images of the object on the conveyor line;

a lens rotation device having:
  a lens frame;
  a magnifying lens; and
  a motor mounted between the coupling portions for positioning of the magnifying lens to be selectively aligned to the lens unit of the camera as the motor is driven, wherein the motor includes a rotation shaft mounted between the coupling portions and the lens frame is connected to the rotation shaft of the motor, and wherein the magnifying lens is mounted to the lens frame and is selectively positioned to be aligned to the lens unit of the camera according to driving of the motor; and a controller for controlling operation of the motor of the lens rotation device and comparing the images acquired by the camera at different times to determine a moving speed of the object, wherein the controller
  controls operation of the lens rotation device for positioning the magnifying lens to be aligned to the lens unit;
  controls the camera to acquire a first image of the object;
  makes a first coordinate transformation of the first image of the object and storing a first coordinate transformed image; and
  determines the moving speed of the object by using a coordinate movement of the first coordinate transformed image and times the first image is acquired, and
  controls operation of the lens rotation device such that the magnifying lens moves away from the lens unit;
  acquires a second image of the object with the camera,
  makes a second coordinate transformation of the second image of the object and storing a second coordinate transformed image; and
  determines that there is an error taken place in the first and second images when it is determined that the first and second coordinate transformed images have changes.

2. The speed measuring apparatus of claim 1, wherein the coupling module includes a "U" shaped curved frame having the coupling portions formed extended from the first and second sides.

3. The speed measuring apparatus of claim 2, wherein the lighting unit is formed in a curved shape in the same shape with the curved frame.

4. The speed measuring apparatus of claim 1, wherein the lighting unit is an infrared lighting.

5. The speed measuring apparatus of claim 1, wherein the lighting unit is a dark field lighting.

6. The speed measuring apparatus of claim 1, wherein the lighting unit lights the surface to be measured at an angle below 10 degrees with reference to the surface to be measured.

7. The speed measuring apparatus of claim 1, wherein the camera is an infrared camera.

8. The speed measuring apparatus of claim 1, wherein the lens frame has a semicircular shape.

9. A speed measuring apparatus for a conveyor line comprising:

a coupling module mounted to one side of the conveyor line with a bracket, the coupling module having coupling portions formed on first and second sides of the coupling module;

an infrared lighting mounted to one side of the coupling module for lighting an object on the conveyor line with an infrared beam;

an infrared camera having a lens unit mounted between the coupling portions to face in a direction for obtaining infrared images of the conveyor line;

a lens rotation device including a lens frame, a magnifying lens, and a motor for positioning the magnifying lens to be selectively aligned to the infrared camera, wherein the motor having a rotation shaft is mounted between the coupling portions, the lens frame is connected to the rotation shaft of the motor, and the magnifying lens mounted to the lens frame is selectively positioned to be aligned to the lens unit of the infrared camera according to driving of the motor; and a controller for controlling operation of the lens rotation device and comparing the infrared images acquired by the infrared camera at different times to determine a moving speed of the object, wherein the controller
  controls operation of the lens rotation device for positioning the magnifying lens to be aligned to the lens unit;
  controls the infrared camera to acquire a first infrared image of the object;
  makes a first coordinate transformation of the first infrared image of the object and storing a first coordinate transformed image; and
  determines the moving speed of the object by using a coordinate movement of the first coordinate transformed image and times the first infrared image is acquired, and
  controls operation of the lens rotation device such that the magnifying lens moves away from the lens unit;
  acquires a second image of the object with the infrared camera,
  makes a second coordinate transformation of a second infrared image of the object and storing a second coordinate transformed image; and
  determines that there is an error taken place in first and second infrared images when it is determined that the first and second coordinate transformed images have changes.

* * * * *